United States Patent
Flyborg

[19]
[11] Patent Number: 6,053,569
[45] Date of Patent: Apr. 25, 2000

[54] INTEGRATED CAR CHILD PROTECTION

[75] Inventor: Sven Flyborg, Torslanda, Sweden

[73] Assignee: AB Volvo, Sweden

[21] Appl. No.: 08/952,956

[22] PCT Filed: May 30, 1996

[86] PCT No.: PCT/SE96/00697

§ 371 Date: Nov. 24, 1997

§ 102(e) Date: Nov. 24, 1997

[87] PCT Pub. No.: WO96/38317

PCT Pub. Date: Dec. 5, 1996

[30] Foreign Application Priority Data

May 31, 1995 [SE] Sweden .................................. 9404244

[51] Int. Cl.[7] .................................................. B60N 2/02
[52] U.S. Cl. ........................ 297/94; 297/238; 297/283.3; 297/344.1; 297/383
[58] Field of Search ..................................... 297/383, 238, 297/313, 338, 344.13, 344.12, 94, 353, 283.3, 283.1, 344.1, 284.1; 296/65.1, 68, 65.01, 65.06, 65.11

[56] References Cited

U.S. PATENT DOCUMENTS

| | | |
|---|---|---|
| 128,029 | 6/1872 | Ewald . |
| 363,211 | 5/1887 | Cowing . |
| 433,125 | 7/1890 | Haulenbeek . |
| 769,876 | 9/1904 | Schuster . |
| 1,429,368 | 9/1922 | Owler et al. . |
| 1,685,770 | 10/1928 | Bowen . |
| 1,695,101 | 12/1928 | Hoffman . |
| 1,770,826 | 7/1930 | Allgeyer . |
| 2,822,858 | 2/1958 | Mussler . |
| 3,944,277 | 3/1976 | Cyphert . |
| 4,541,654 | 9/1985 | Jonasson . |
| 4,655,503 | 4/1987 | Kamijo et al. . |
| 4,712,824 | 12/1987 | Naert . |
| 4,822,093 | 4/1989 | Kawai et al. . |
| 4,834,333 | 5/1989 | Saito et al. . |
| 5,067,187 | 11/1991 | Messina . |
| 5,378,040 | 1/1995 | Chaney et al. . |

FOREIGN PATENT DOCUMENTS

| | | |
|---|---|---|
| 0 479 006 A1 | 4/1992 | European Pat. Off. . |
| 2699129 | 6/1994 | France . |
| 605321 | 5/1960 | Italy . |
| 448219 | 9/1981 | Sweden . |
| 83/03978 | 11/1983 | WIPO . |

*Primary Examiner*—Milton Nelson, Jr.
*Attorney, Agent, or Firm*—Lerner, David, Littenberg, Krumholz & Mentlik, LLP

[57] ABSTRACT

Vehicle seats are disclosed including a seat, a backrest interconnected with the seat, a guide for displaceably removing the backrest along the seat from the rear to the front of the seat, and a lock for locking the backrest in an arbitrarily selected position between the rear and front portions of the seat.

4 Claims, 5 Drawing Sheets

INTEGRATED CAR CHILD PROTECTION

TECHNICAL FIELD

The present invention relates to a vehicle seat and more precisely a seat in which several user functions/possibilities are integrated in one and the same seat.

The vehicle seat according to the invention, in addition to the normal user function as a passenger seat, discloses a possibility for use as a child seat, facing forwards or backwards, and a possibility of use as a backward-facing reclining chair for an adult.

STATE OF THE ART

U.S. Pat. No. 4,655,503 relates to a vehicle seat in which the back rest is displaceable relative to the seat part and fixable in a normal position and a front end position, respectively. The back of the back rest has an arrangement for creating a backward-facing child seat when the back rest is positioned in the front end position.

Swedish published specification 448,219 discloses another example of how the rear of the back rest, due to its specific design and adjustability to a front end position along the seat part, may be used for providing a child seat with the back of the child facing in the driving direction.

Swedish published specification 443,335 relates to a vehicle seat in which the rear of the back rest has a box which can be folded out to form a backward-facing child seat. The back is settable to a forward inclination, but is not displaceable along the seat part.

OBJECT OF THE INVENTION

One object of the present invention is to provide a vehicle seat which combines passenger comfort and safety, for a child as well as an adult.

A further object of the vehicle seat is to offer resting comfort also for an adult.

Another object is to basically maintain exteriorly the traditional vehicle seat design, which implies that the vehicle seat will be useful in existing as well as newly manufactured vehicles.

Still a further object of the invention is to extend the field of use of existing, so-called integrated vehicle seats.

THE INVENTION

The invention provides a vehicle seat, comprising a seat part and a back rest, means interconnecting the back rest and the seat part, means for allowing displacement in the longitudinal direction of the vehicle of the back rest relative to the seat part, and means on the rear of the back rest for forming at least part of a child seat.

The vehicle seat is characterized in that said means for interconnecting the back rest and the seat part comprise a frame arrangement having a locking member, which is releasable for rotation of the back rest 180° around a rotation axis extending in the height direction of the back rest.

In a preferred embodiment said means for allowing displacement of the back rest along the seat part in the longitudinal direction of the vehicle comprises a guide arrangement and means for fixing the back rest to the seat part in an arbitrary position along the seat part.

In another preferred embodiment the seat part is provided with means for height adjustment of the front and back edges thereof.

In a suitable embodiment the back rest has a flap arrangement which is outwardly pivotable from the rear of the back rest and comprises elements forming side supports of a child seat.

To prevent a child from sliding under the safety belt, primarily when the child seat is in a position facing forwards, the seat part is preferably rotatable or dividable along a horizontal axis, such that an underside designed to prevent sliding will be facing upwards.

BRIEF DESCRIPTION OF THE DRAWINGS

The invention will now be described with reference to embodiments disclosed on the accompanying drawings where.

Figure 1:
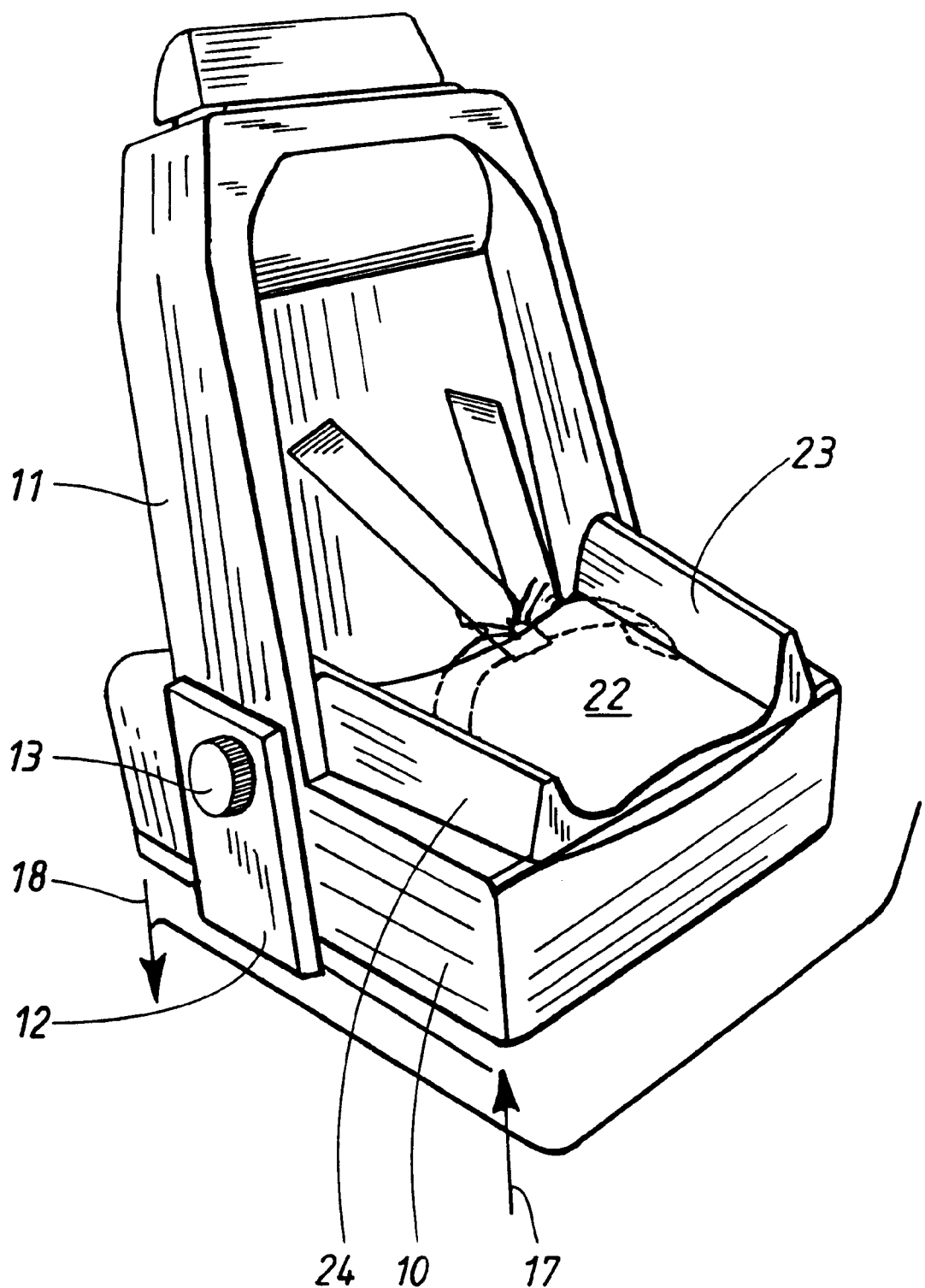
FIG. 1 shows a vehicle seat according to the invention having a box-like arrangement on the rear of the back rest of the seat and provided for forming a backward-facing child seat.
Figure 2:
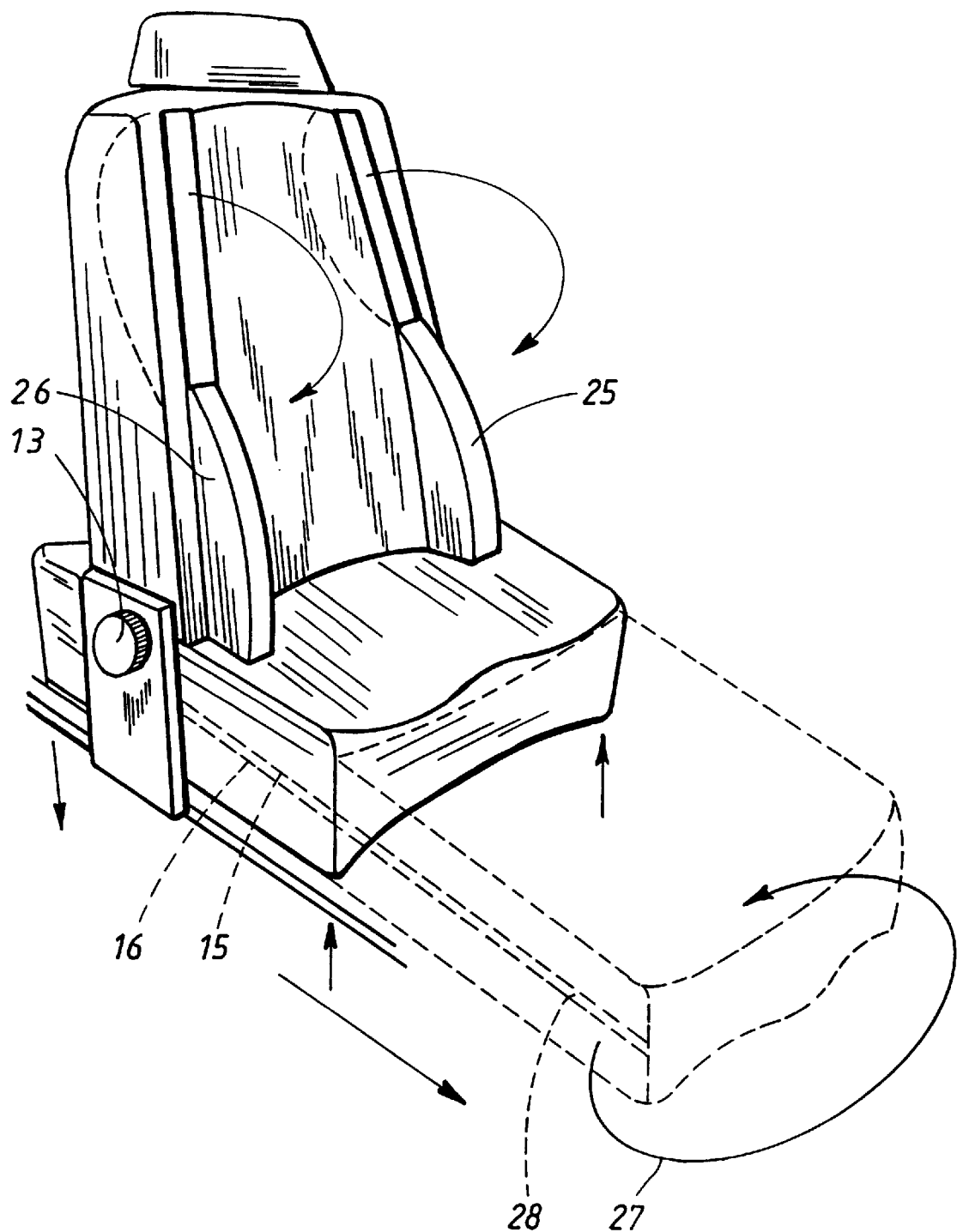
FIG. 2 shows another embodiment of arrangements for forming a backward-facing child seat on the back rest of the vehicle seat, and shows with broken lines how the seat part may be rotated around a horizontal axis or divided in the longitudinal direction of the vehicle.

The vehicle seat in FIG. 1 comprises a seat part 10 and a back rest 11. Brackets 12 at each seat side, having locking/positioning control 13 at at least one side, are attached to a back frame 14 (FIG. 3) and a seat frame 15 (FIG. 2).

The back frame and the back 11 mounted on said frame are inclinable relative to the seat part 10 by means of the control 13. The brackets 12 slide in longitudinal grooves 16 at either side of the seat and the back 14, 11/back frame attached by means of the brackets is displaceable continuously along the seat part and lockable.

The arrows 17, 18 in the drawings indicate that the front and back edges of the seat part are adjustable individually in the height direction. This is accomplished by means of arrangements known per se.

Figure 3:
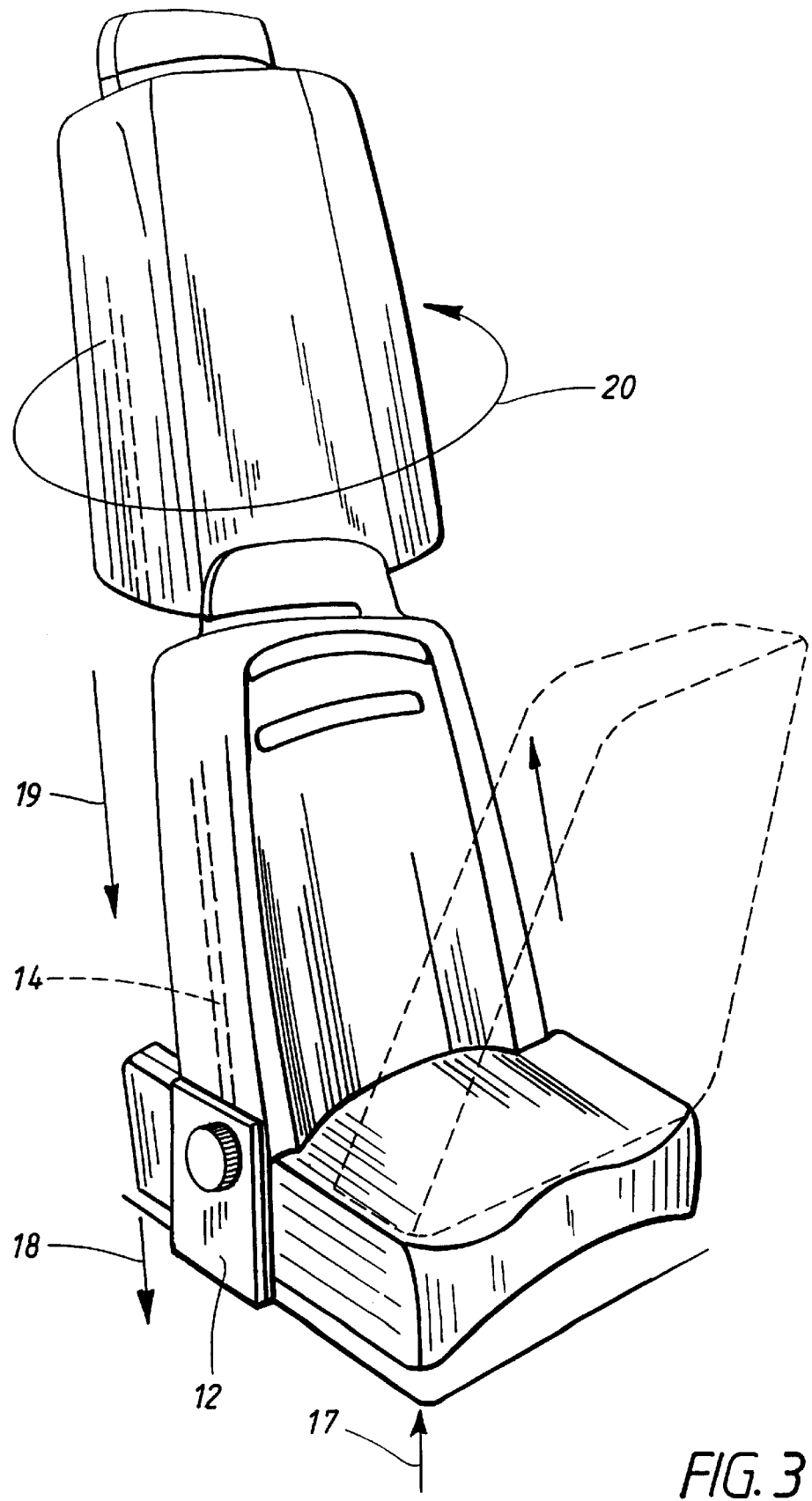
FIG. 3 shows in broken lines the back rest in one embodiment rotated round a rotation axis extending in the height direction of the back rest.

The arrow 19 in FIG. 3 indicates that the back rest 11 is moveable in the height direction, i.e. together with the arrow 20 it is illustrated that the back part may be raised upwards in the figure, thereafter rotated 180° round a rotation axis extending in the height direction of the back rest, and thereafter again lowered in the direction of the arrow 19 downwardly to lock into the seat frame 15.

Figure 4:
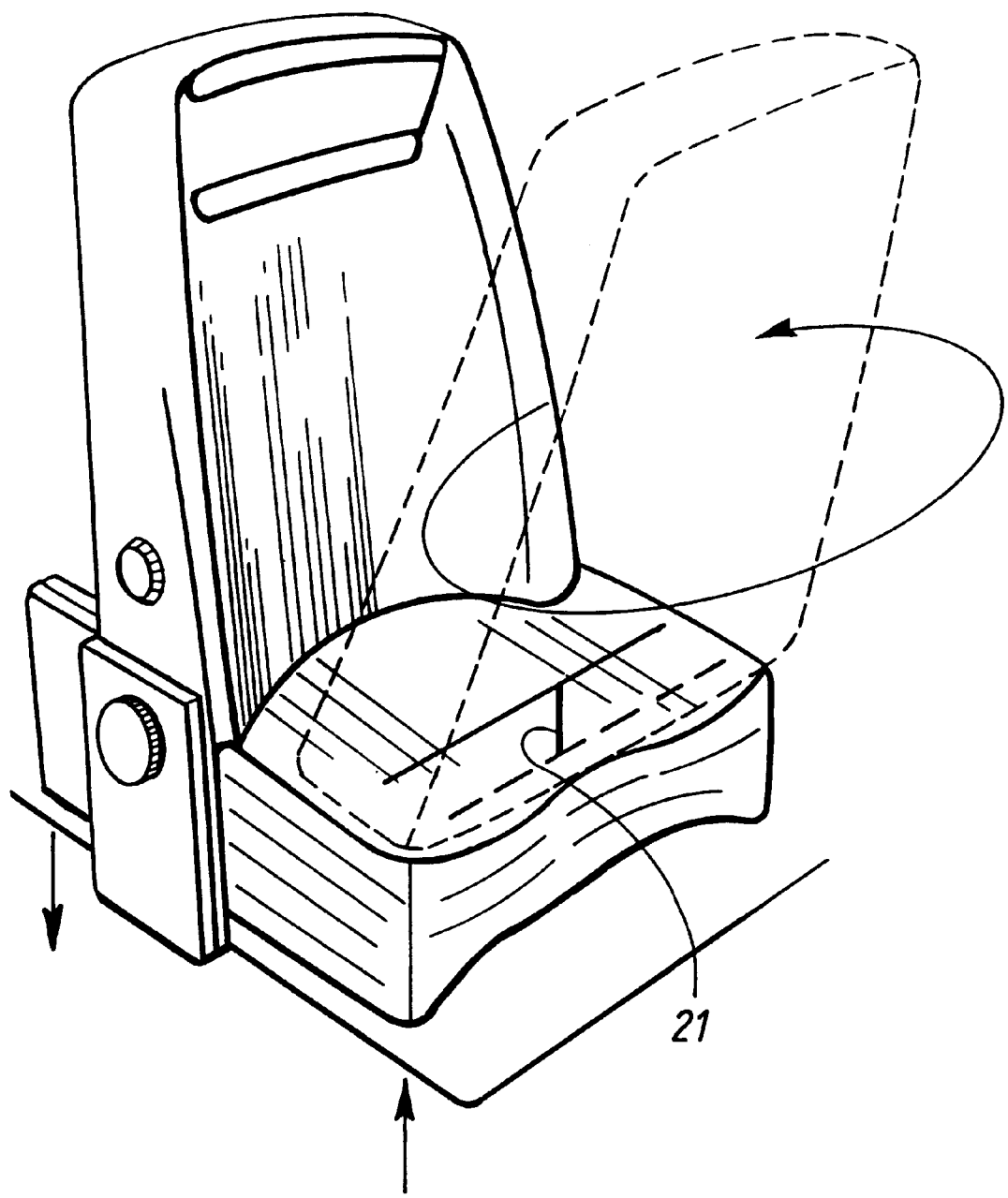
FIG. 4 shows schematically how the back rest is rotated around a stud which rotatably interconnects the back rest and the seat part.

FIG. 4 shows a stud 21 around which the back frame 14 and thus the back are rotated relative to the seat.

With reference to FIG. 1, this shows how a box 22 having sides 23, 24 is unfoldable from the rear of the back rest to form a child seat.

Another embodiment of the child seat is disclosed in FIG. 2 where flap-like side protectors 25, 26 are unfoldable from the rear of the back rest.

The arrow 27 further indicates that the seat part is rotatable 180° around a horizontal rotation axis extending in the longitudinal direction of the vehicle. The object of this is to provide an optimum design of the side of the seat part used for sitting in the different applications/fields of use which are relevant here.

Another possibility of achieving the said object resides in forming the seat part dividable along a division surface 28.

In all figures in the drawings the rear of the back rest is shown in solid lines.

Thus, in FIG. 1 the vehicle seat is arranged as a backward-facing child seat.

Broken lines show the vehicle seat arranged as a forward-facing child seat. In this application it is also possible to use a rotation possibility or division of the seat part as in FIG. 2.

If the back part shown by broken lines in FIG. 3 is moved forwards along the guides 16 and the back rest is inclined forwards by means of the locking/setting control 13 the reclining position for an adult mentioned in the introductory part will be obtained.

Figure 5:
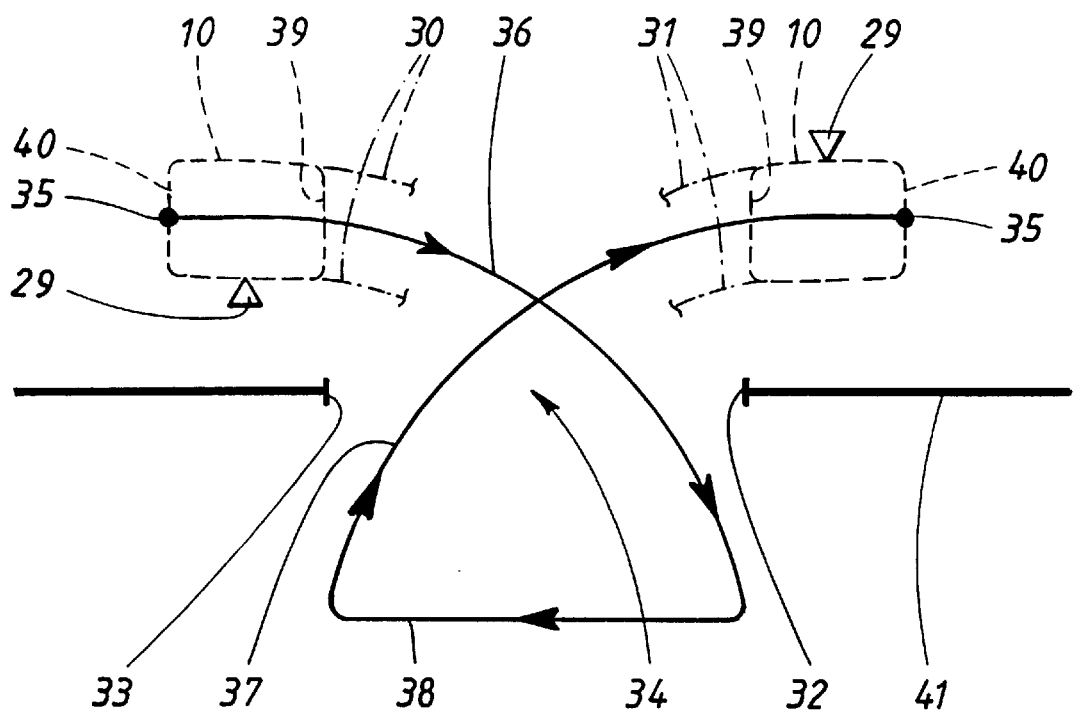
FIG. 5 shows a further development of a vehicle seat which may comprise one or more of the specific features of the seats in the previous embodiments.

In FIG. 5 the reference numeral 41 schematically denotes the side wall of a vehicle, in this case at the front passenger seat position, and the opening 34 defined by the front and back door posts 32, 33 represents the door opening.

The vehicle seat, which, as mentioned, can comprise several of the features described previously, is shown in a first position to the left in the figure and a second position to the right in the same figure. The first position represents the normal seat position where the passenger in the seat is facing in the driving direction. The position to the right in FIG. 5 represents the opposite situation.

The vehicle seat comprises a seat portion and a back portion and a frame means for reinforcing and interconnecting said seat portion and back portion. For the sake of simplicity, such elements have not been indicated in FIG. 5. Additionally, the vehicle seat is provided with means for locking the seat in predetermined positions, and such means have not been shown as they basically are well known in general. The existence of such means has been shown by reference numeral 29.

The vehicle seat arrangement in FIG. 5 has a special guide means 30, 31 for controlled movement and repositioning of the vehicle seat. Said guide means comprise a first guide element 30 which defines a first curved movement path 36 for the vehicle seat. As indicated in FIG. 5, the movement path for a specific point of the seat extends outside the vehicle side 41, which means that the movement path, and thus the guide element 30, are such that at least part of the vehicle seat can be placed outside the door opening 34. To achieve this, the guide element arrangement 30 can be arranged fully inside the side wall 41 or, if necessary and desired, there may be extendible parts of the guide 30 which can be placed temporarily outside the side wall 41.

A second guide element arrangement 31 is mounted inside the vehicle, basically in the same manner as the first guide element 31, but with an opposite curvature seen in the driving direction. Said second guide element arrangement defines a second movement path 37 and allows reintroduction through the door opening 34 of said at least part of the vehicle seat which has been placed temporarily outside the door opening. When the vehicle seat has been moved all the way along the movement path 37 to the end position shown in FIG. 5 the side 39 of the seat part is turned backwards and the opposite side forwards.

In FIG. 5 a third movement path 38 is indicated which defines a translational movement which in certain cases it may be necessary to include in order to reintroduce the vehicle seat through the door opening 34.

For controlling the movement of the vehicle seat during the operation of turning the vehicle seat 180°, there is a guide means follower member 35 which is arranged to allow translational and rotational movement along the first and second guide elements 30, 31. Such a guide means follower member has been shown very schematically merely to indicate that the 180° rotation of the vehicle seat is carried out in a fully controlled manner.

What is claimed is:

1. A vehicle seat for use in a vehicle including a door opening, said vehicle seat comprising a seat portion including a forward section and a rearward section, a backrest portion, a frame interconnecting said seat portion with said backrest portion, a seat guide for defining a movement path for said seat portion, and a seat lock for locking said seat portion in a predetermined position along said movement path, said seat guide comprising a first seat guide portion defining a first movement path for said seat whereby said seat can be placed temporarily outside of said door opening in said vehicle, a second seat guide portion defining a second movement path for said seat portion whereby said seat portion can be reintroduced into said vehicle through said door opening, and a guide follower attached to said frame whereby said seat portion is removed translationally and rotatably along said movement path.

2. The vehicle seat of claim 1 wherein said first movement path comprises a first curved movement path, and said second movement path comprises a curved movement path, said second curved movement path being curved in an opposite direction from said first curved movement path, whereby said seat portion and said backrest portion can be oriented in a predetermined orientation along said first movement path and said vehicle seat can be reintroduced into said vehicle with said seat portion and said backrest portion oriented oppositely from said predetermined orientation.

3. The vehicle seat of claim 2 including a third seat guide portion defining a third movement path for translational movement of said vehicle seat outside of said door.

4. A vehicle seat comprising a seat portion including a forward section and a rearward section, a backrest portion including a lower section and an upper section, a frame for interconnecting said seat portion with said backrest portion, a guide for displaceably moving said lower section of said backrest portion along said seat portion from said rearward section to said forward section, rotatable support means for rotatable supporting said backrest portion about an axis extending substantially parallel to said backrest portion whereby said backrest portion can be rotated about said axis to reverse said front surfaces and rear surfaces thereof, and at least a portion of a child's seat formed on said rear surface of said backrest portion.

* * * * *

UNITED STATES PATENT AND TRADEMARK OFFICE
CERTIFICATE OF CORRECTION

| | | |
|---|---|---|
| PATENT NO. | : | 6,053,569 |
| DATED | : | April 25, 2000 |
| INVENTOR(S) | : | Flyborg |

It is certified that error appears in the above-identified patent and that said Letters Patent is hereby corrected as shown below:

Title page, item [86], § 371 Date should read --Nov. 25, 1997--.

Title page, item [86], § 102(e) Date should read --Nov. 25, 1997--.

Col. 4, line 51, "rotatable" should read --rotatably--.

Signed and Sealed this

Twenty-fourth Day of April, 2001

NICHOLAS P. GODICI

*Attest:*

*Attesting Officer*     *Acting Director of the United States Patent and Trademark Office*